United States Patent [19]

Seragnoli

[11] Patent Number: 4,506,779
[45] Date of Patent: Mar. 26, 1985

[54] DEVICE FOR TRANSFERRING BAR SHAPED ARTICLES

[75] Inventor: Enzo Seragnoli, Bologna, Italy

[73] Assignee: G.D. Società per Azioni, Bologna, Italy

[21] Appl. No.: 619,409

[22] Filed: Jun. 12, 1984

Related U.S. Application Data

[63] Continuation of Ser. No. 307,935, Oct. 2, 1981, abandoned.

[30] Foreign Application Priority Data

Dec. 12, 1980 [IT] Italy ............................ 50353 A/80

[51] Int. Cl.³ .......................................... B65G 47/31
[52] U.S. Cl. .................................. 198/461; 198/478; 198/689
[58] Field of Search .............. 198/461, 478, 480, 689, 198/479, 476

[56] References Cited

U.S. PATENT DOCUMENTS

| | | | |
|---|---|---|---|
| 1,689,247 | 10/1928 | Lange | 198/478 |
| 3,303,926 | 2/1967 | Pohl | 198/689 |
| 3,521,513 | 7/1970 | Gomann et al. | 198/480 |
| 4,266,655 | 5/1981 | Payne | 198/461 |
| 4,408,621 | 10/1983 | Schumacher | 198/478 |

FOREIGN PATENT DOCUMENTS 1469991 4/1977 United Kingdom ............... 198/478

Primary Examiner—Joseph E. Valenza
Assistant Examiner—Daniel R. Alexander
Attorney, Agent, or Firm—Cushman, Darby & Cushman

[57] ABSTRACT

Apparatus for transferring bar shaped articles from one conveyor to another wherein the two conveyors are each provided with equally spaced suction housings for holding the articles with the spacing in one conveyor being different from the other. The apparatus comprises a link-up conveyor which includes a first and a second rotating element that revolve in the same direction at identical angular velocity, around separate parallel axes. To the perimeter of the first rotating element are pivoted equally spaced cranks, each provided with a suction housing for holding and releasing an article. Each crank is connected to the second element by a link which, as the link-up conveyor rotates, causes it to oscillate at such a rate as to match the velocity of the crank suction housing to that of the suction housings of the two conveyors in the positions in which the articles are transferred thereto or therefrom by the link-up conveyor.

3 Claims, 2 Drawing Figures

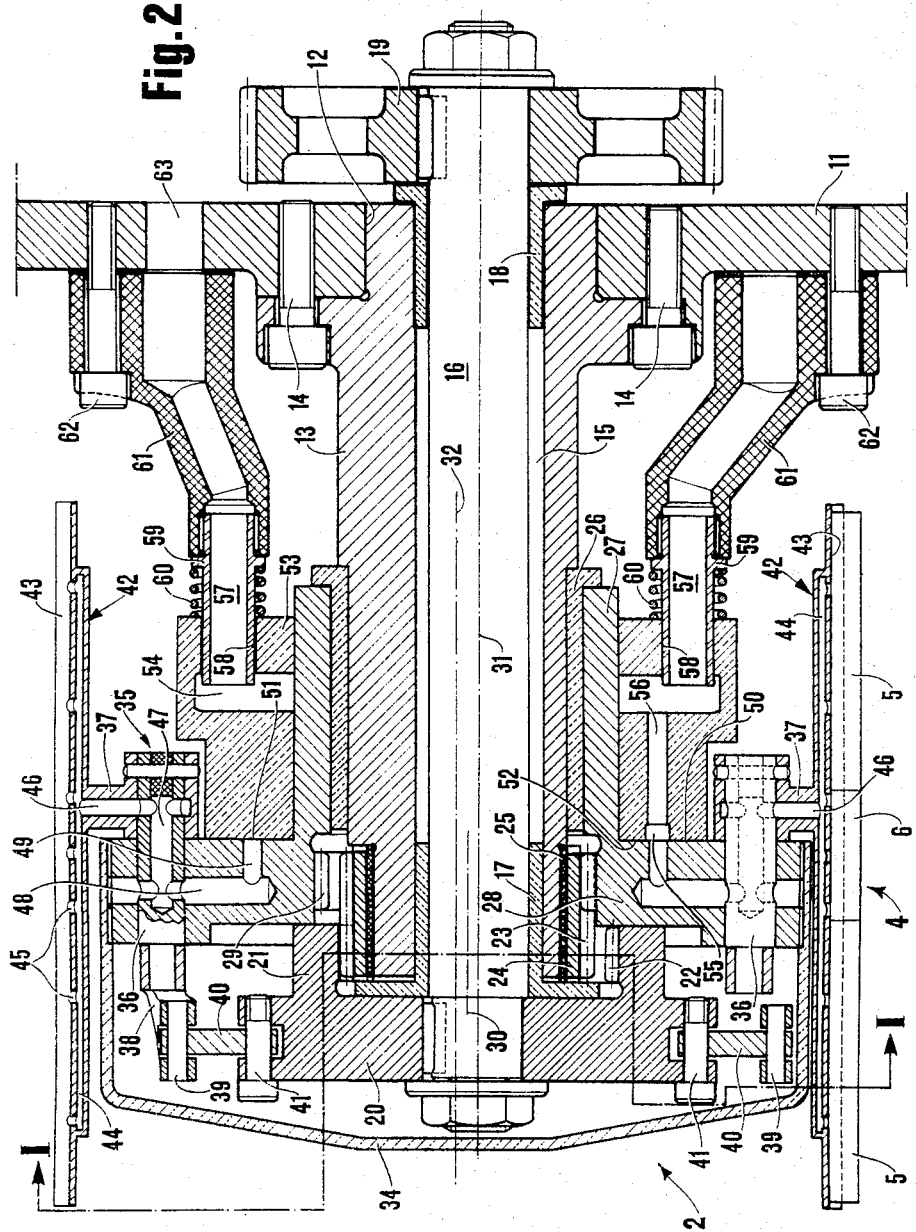

DEVICE FOR TRANSFERRING BAR SHAPED ARTICLES

This is a continuation of application Ser. No. 307,935, filed Oct. 2, 1981, abandoned.

BACKGROUND OF THE INVENTION

The subject of the invention is a device for transferring bar shaped articles, and more particularly it relates to a device that is able to vary the pitch at which the said articles, carried in a forward direction perpendicular to their axis, are spaced.

In the description that follows, the term "bar shaped articles" is referred, in particular, to cigarettes, filters, cigarettes with a filter and similar products of the tobacco industry.

DESCRIPTION OF THE PRIOR ART

The known practice on what are called the filter fitting machines is for the items destined to constitute the cigarettes with a filter, that is to say the filtering element and the cigarette, to be channelled jointly into peripheral suction housings in conveyor rollers that are given a rotatory motion.

In certain areas of the filter fitting machine, the pitch of the said housings is dependent on factors such as the output speed of the machine on which the cigarettes are made and the infeed rhythm of the filtering elements, and in other areas of the machine it cannot be suitable for the execution of certain operations on the articles being processed.

The joining of the filters to the cigarettes is, for example, normally effected by causing the items to be connected to roll over glued jointing bands, and it can generally only be done provided that the said housings are inter-spaced at a distance greater than the length of one band.

The said distance can differ noticeably from the pitch of the housings in other areas of the filter fitting machine; usually the former is greater than the latter.

In conformity with what has been stated above, the necessity thus sometimes arises to vary the pitch at which the articles undergoing the processing operations are carried along.

A device is known, described in U.K. Pat. No. 1,469,991, in which the means for supporting the articles are located at one free extremity of corresponding rods, the other extremity of which is pivoted, in a rotatable fashion, to a common rotating shaft.

The middle of each rod is connected, by means of a link rod, to one arm of a corresponding twin arm lever pivoted onto the perimeter of a drive disk that is keyed to the above mentioned shaft.

The said levers are supported by the disk with constant angular spacing, and the free arm of each supports idle rollers engaged in a grooving in a fixed cam that faces the disk.

While the latter rotates at a constant velocity, the rods it drives oscillate, on account of the engagement between the cam and the levers, around the said shaft and match, in the areas where the articles have to be accepted and yielded, the velocity of the support means to the respective velocities of the conveyors belonging to the device.

Besides being somewhat complex, a device of this type is not very suitable for use on modern, high output, filter fitting machines.

It is, in fact, necessary to restrict as far as possible, on the said machines, the velocity at which the said articles are conveyed, so as to limit the possibility of damage being occasioned thereto because of too energetic an action on the part of the means of restraint.

The said velocity can only be limited by keeping the pitch at which the articles are carried forward, at fairly low values which, inevitably, can be exceeded when the device described herein is utilized.

SUMMARY OF THE INVENTION

The object of the device forming the subject of the invention (wherein the pitch in the support means has to be fairly large, at least outside the areas where the articles are accepted and yielded, since the number of rods that the said shaft can support is very reduced and the said rods are arranged along the shaft, one closely at the side of the other) is to make available a device of the aforementioned type in which problems typical of the described device of a known type are not present.

This and other objects too are all attained with the device for transferring bar shaped articles, according to the invention, comprising two conveyors provided with housings for accommodating the said articles, spaced in each conveyor at a different pitch, and a link-up conveyor that connects the said two conveyors one to the other and is adjacent thereto in the region of what are defined transfer positions, essential features of the device being that the said link-up conveyor comprises a first rotating element for supporting a plurality of pivoted cranks, each of which equipped with an arm provided with a housing for accommodating and withholding one of the said articles, and a second rotating element, carried in rotation in the same direction and at the same angular velocity as the former, mounted on a separate axis parallel to that of the said first rotating element, means of connection being provided between the said second rotating element and each of the said pivoted cranks.

BRIEF DESCRIPTION OF THE DRAWINGS

Further characteristics and advantages will become more apparent from the detailed description that follows of one preferred form of embodiment for the device according to the invention, illustrated purely as an unlimited example on the accompanying drawings, in which:

FIG. 2 is an axial section of the device depicted in FIG. 1.

DESCRIPTION OF THE PREFERRED EMBODIMENT

Figure 1:
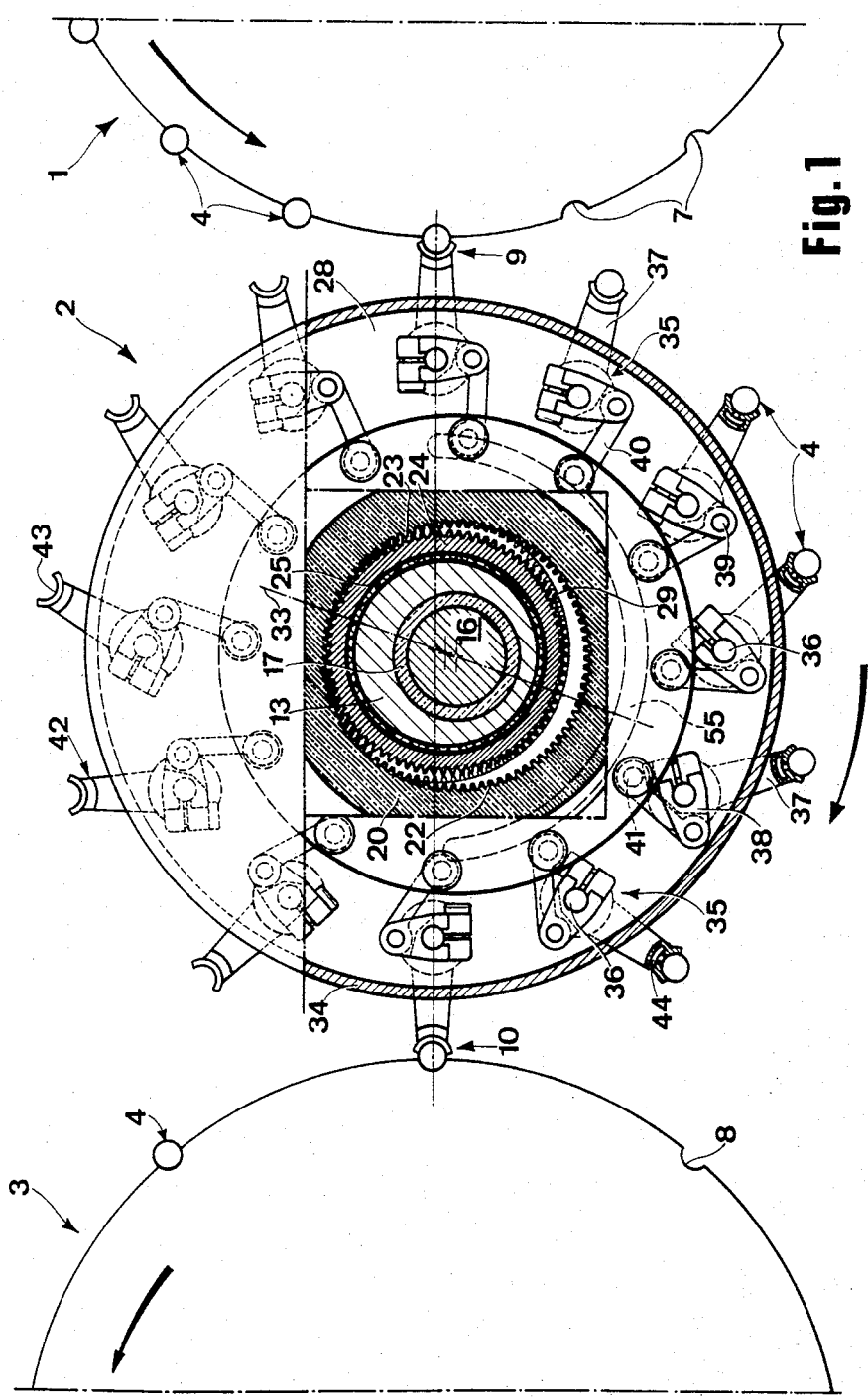
FIG. 1 is a front diagrammatic view, partially in sectional form, of a form of embodiment for the device according to the invention.

With particular reference to FIG. 1, at 1, 2 and 3 are shown, from right to left, three rotating conveyors on inter-parallel horizontal axes, designed to transfer batches 4 constituted by two axially aligned cigarettes 5 having interposed a filter cutting 6 of a length twice that of the filter of one single cigarette.

The conveyors 1 and 3, constituted by rollers placed in counter clockwise rotation by non-illustrated means, are provided peripherally with longitudinal housings shown at 7 and 8, respectively, inside which the said batches 4 are withheld by suction in a known manner.

Both for the housings 7 and for the housings 8, the pitch is constant but that of the former, in the example in FIG. 1, is lesser than that of the latter.

The conveyor 2, which hereinafter will also be defined the pitch varying device, has the task of transferring in succession the batches 4 from the roller 1 to the roller 3 and of modifying the spacing one from the other.

The positions in which the said batches 4 are accepted and yielded by the device 2, called the transfer positions or areas, are numbered 9 and 10, respectively.

The said conveyor 2 is supported by a vertical wall 11 (see FIG. 2) that is part of the frame of the filter fitting machine, and it is provided with clockwise rotatory motion by drive means, more about which will be said in due course.

The wall 11 has in it a circular aperture 12, inside which is housed the rigthand extremity of a horizontal sleeve 13 flanged to the wall 11 by means of screws 14.

Machined in the inside of the sleeve 13 there is a longitudinal cylindrical cavity 15 that is eccentric with respect to the external surface of the said sleeve 13 and through which passes a shaft 16 supported by bushings, shown from left to right in FIG. 2 at 17 and 18, placed at the extremities of the cavity 15.

The righthand extremity of the shaft 16 is integral with a gearwheel 19 connected to a non-illustrated source of motion, that acts as the drive means for the conveyor 2.

The lefthand extremity of the shaft 16 has keyed to it a disk or rotating element 20, provided on the side turned towards the wall 11 with a ring 21 coaxial thereto and having internal toothing 22.

The said ring 21 meshes with the toothing 23 of a gearwheel 24 that is supported in a rotatable fashion through a bushing 25 at the free extremity of the sleeve 13.

To the right of the gearwheel 24, the sleeve 13 supports, via a bushing 26, a rotating element constituted by a tube 27, from the extremity of which turned towards the disk 20 is cantilevered an annular element 28 provided internally with toothing 29, that meshes with the said toothing 23 of the gearwheel 24 to the right of the meshing area of the ring 21.

The axis of the gearwheel 24, shown at 30, does not coincide with that of the disk 20 or with that of the tube 27, shown at 31 and 32, respectively, but is placed in an intermediate position there between, in a common plane shown at 33 in FIG. 1.

The annular element 29, with whose perimeter is integral a protective cover 34 for the device in question, supports in a rotatable fashion, in proximity of the perimetral border thereof, a plurality of articulations or twin arm cranks 35, twelve in FIG. 1, spaced equidistantly.

The fulcrum of each crank 35 is constituted by a pin 36 parallel to the shaft 16, that passes through the annular element 28 and supports at the two extremities, on the right and on the left, respectively, in FIG. 2, corresponding arms 37 and 38 placed virtually at right angles.

The free extremity of each arm 38 is connected, via a pin 39 parallel to the shaft 16, to a link rod 40 which, in turn, is connected to the disk 20 through a pin 41 parallel to the pin 39.

Each arm 37 supports a bar 42 parallel to the shaft 16, provided with a housing 43 for accepting and withholding a batch 4, through which passes internally a longitudinal cavity 44 which, via the holes 45, communicates with the said housing 43.

The cavity 44 in each bar 42 communicates, via a hole 46 inside the arm 37 and a hole 47 inside the pin 36, with a duct 48 that extends radially inside the annular element 28.

The ducts 48 communicate with the outside via holes 49 made in the wall 50 of the annular element 28 turned towards the wall 11.

The said wall 50 has in it twelve holes 51 arranged around a circumference coaxial to the bushing 26 and opposite the wall 52 of a cylindrical body 53 mounted idly on the tube 13 and provided internally with an annular cavity 54.

A slot 55 made in the lower part of the wall 52 over an arc of 180° and a hole 56, place part of the holes 51 in communication with the annular cavity 54.

A plurality of tubular inserts 57 (two of which are depicted in FIG. 2) penetrate the annular cavity 54 through holes 58. Each of the said inserts 57 is provided, externally to the cylindrical body 53, with a ring 59 for contrasting a helical spring 60 that is wound around the insert 57 itself and presses onto the cylindrical body 53.

The said inserts 57 pass inside the hollow arms 61 secured to the wall 11 by means of screws 62. One of the said hollow arms 61, namely the top one in FIG. 2, communicates with non-illustrated suction means, via a hole 63 drilled in the wall 11.

With the device according to the invention in operation, the batches are transferred in succession from the housings 7 of the roller 1 to the housings 8 of the roller 3 by means of the pitch varying device 2.

The drive of the latter is, as previously stated, taken from the shaft 16 which, in addition to the disk 20, carries the annular element 28 in rotation, through the gearwheel 24 meshed with the toothing 22 and 29.

As the conveyor 2 rotates around the axis 32, the cranks 35, because of the misalignment between the disk 20 and the annular element 28, are subjected to two-way oscillation around the pins 36.

More precisely, as shown in FIG. 1, with the approach of the cranks 35 to the position 9, they rotate in a counter clockwise direction around the pins 36 and thus decrease the effective forward velocity of the housings 43 until the relative velocity of these is, in the said position 9, annulled with respect to that of the housings 7.

Once a batch 4 has been accepted inside its housing 43, each crank 35 continues to rotate in a counter clockwise direction up until the moment when the pin 39 of the link rod 40 connected thereto reaches with the axis thereof, the plane 33 in which the axes 30, 31 and 32 lie.

At the said moment and in the said position, each crank 35 commences a clockwise rotation around the pin 36 causing a progressive acceleration of the corresponding housing 43 whereby to ensure, once position 10 has been reached, that a batch 4 be yielded at an identical condition of velocity from the housing 43 to the housing 8.

The described clockwise rotation of the cranks 35 thus continues, for each one, up until the moment when the relevant pin 39 reaches with the axis thereof, the plane 33. At that moment an inversion takes place in the said direction of rotation and this determines for each crank 35, a return to the considered initial condition.

In order that the above described operations be correctly performed, that is to say, with the velocity of the housings 43 corresponding, in positions 9 and 10, to that of the housings 7 and 8, respectively, and with a well synchronized approach of the former to the latter, it is advisable that the mean peripheral rate of motion of the housings 43 be virtually identical to the mean peripheral rate of motion of the housings 7 and 8 in the rollers 1 and 3, and this is done by dimensioning appropriately the device 2.

The yielding of a batch 4 from one housing to another is achieved through the suction applied by the accepting housing.

In the described device, the said suction is regulated by the slot 55.

Naturally, leaving unchanged the principles of the invention, numerous are the variations it is possible to make to the device described purely as an unlimited example, without in any way deviating from the framework of the invention.

What is claimed is:

1. A device for transferring bar shaped articles while moving perpendicular to their longitudinal axes between two conveyors each provided with equally spaced suction housings for retaining the articles with the spacing in each conveyor being different from the other, comprising: a link-up conveyor positioned between said two conveyors, said link-up conveyor comprising:

a first rotating element supported by a fixed sleeve and carrying a plurality of two arm pivoted cranks, one arm of each crank being provided with a suction housing for picking up an article from one of said two conveyors and delivering it to the other;

a second rotating element mounted on a driven shaft which passes through said sleeve and rotates on an axis spaced from and parallel to the rotational axis of said first rotating element;

a gearwheel in meshing engagement with both of said elements, said gearwheel being supported by said sleeve and rotatable on an axis spaced from and parallel to said axes of said elements; and the other arm of each of said cranks being linked peripherally to said second rotating element so that said cranks oscillate with respect to said first rotating element during the movement of a said crank housing from a pick-up position to a delivery position and back to a pick-up position so as to match the crank housing positions and speeds, at pick-up and delivery positions, with the corresponding positions and speeds of said housings of said two conveyors.

2. A device according to claim 1, including a plurality of link rods, each of which connects the other arm of said cranks to said second rotating element.

3. A device according to claim 1, wherein the mean peripheral rate of motion of the crank housings is virtually identical to the mean peripheral rate of motion of the housings of the two conveyors.

* * * * *